US012616636B2

(12) United States Patent
Huang

(10) Patent No.: US 12,616,636 B2
(45) Date of Patent: May 5, 2026

(54) HAND TOOL FOR REDUCING HAND VIBRATION

(71) Applicant: Chen-Hsuan Huang, Taipei City (TW)

(72) Inventor: Chen-Hsuan Huang, Taipei City (TW)

(*) Notice: Subject to any disclaimer, the term of this patent is extended or adjusted under 35 U.S.C. 154(b) by 798 days.

(21) Appl. No.: 17/982,411

(22) Filed: Nov. 7, 2022

(65) Prior Publication Data

US 2023/0172798 A1 Jun. 8, 2023

(30) Foreign Application Priority Data

Dec. 8, 2021 (TW) ................................ 110145795

(51) Int. Cl.
*A61H 23/02* (2006.01)

(52) U.S. Cl.
CPC ..... *A61H 23/02* (2013.01); *A61H 2201/0153* (2013.01)

(58) Field of Classification Search
CPC .. A61H 23/00–06; A61H 1/006; A61H 1/008; A61H 2201/0153
USPC .......................................................... 601/46
See application file for complete search history.

(56) References Cited

U.S. PATENT DOCUMENTS

| | | | | |
|---|---|---|---|---|
| 2015/0119771 | A1* | 4/2015 | Roberts | A61H 23/0218 601/135 |
| 2021/0161759 | A1* | 6/2021 | Minkus | A61H 37/00 |
| 2021/0275389 | A1* | 9/2021 | Su | A61H 23/006 |
| 2022/0104997 | A1* | 4/2022 | Lawrie | A61H 37/00 |
| 2022/0151865 | A1* | 5/2022 | Hu | A61H 23/02 |
| 2022/0168175 | A1* | 6/2022 | Tang | H01B 7/22 |
| 2022/0233397 | A1* | 7/2022 | Huang | A61H 23/0254 |
| 2022/0354735 | A1* | 11/2022 | Curley | A61H 23/006 |

FOREIGN PATENT DOCUMENTS

| | | | |
|---|---|---|---|
| CN | 111888227 A * | 11/2020 | A61H 23/0218 |
| CN | 112545863 A * | 3/2021 | A61H 23/02 |

OTHER PUBLICATIONS

Translation of CN 111888227-A. Accessed from PE2E-Search on Sep. 12, 2025. (Year: 2020).*
Translation of CN 11254863. Accessed from PE2E-Search on Sep. 12, 2025. (Year: 2021).*

* cited by examiner

*Primary Examiner* — Paige Kathleen Bugg
(74) *Attorney, Agent, or Firm* — HSML P.C.

(57) ABSTRACT

A hand tool for reducing hand vibration, including a casing, a driving module, a power module and a workpiece. The casing includes a front section, a rear section, and a buffering section connected between the front and rear sections. The buffering section is made of an elastic material. The rear section is adapted for gripping. The driving module is disposed on the front section. The power module is disposed on the rear section, and is electrically connected to the driving module to supply electricity to the driving module. The workpiece is connected to the driving module, extends out of the front section, and is driven by the driving module to operate.

8 Claims, 14 Drawing Sheets

HAND TOOL FOR REDUCING HAND VIBRATION

CROSS-REFERENCE TO RELATED APPLICATION

This application claims priority of Taiwanese Patent Application No. 110145795, filed on Dec. 8, 2021.

FIELD

The present disclosure relates to a hand tool capable of generating vibration during operation, and more particularly to a hand tool for reducing hand vibration.

BACKGROUND

An existing massage gun accelerates blood circulation and loosens muscles of a sore area through high frequency vibrations to give a massage.

During the use of the massage gun, a human hand is required to hold the massage gun and position the massaging head of the massage gun at a location requiring massage. During the operation of the massage gun, high frequency vibration is continuously generated. Although the part requiring massage can be massaged, the hand holding the massage gun may be also vibrated simultaneously, easily causing hand injury or discomfort.

SUMMARY

The object of the disclosure is to provide a hand tool that can alleviate at least one of the drawbacks of the prior art.

According to the disclosure, the hand tool for reducing hand vibration, including a casing, a driving module, a power module and a workplace. The casing includes a front section, a rear section, and a buffering section connected between the front and rear sections. The buffering section is made of an elastic material. The rear section is adapted for gripping. The driving module is disposed on the front section. The power module is disposed on the rear section, and is electrically connected to the driving module to supply electricity to the driving module. The workpiece is connected to the driving module, extends out of the front section, and is driven by the driving module to operate.

BRIEF DESCRIPTION OF THE DRAWINGS

Other features and effects of the disclosure will be clearly presented in the embodying manner with reference to the drawings, in which.

DETAILED DESCRIPTION

Figure 1:
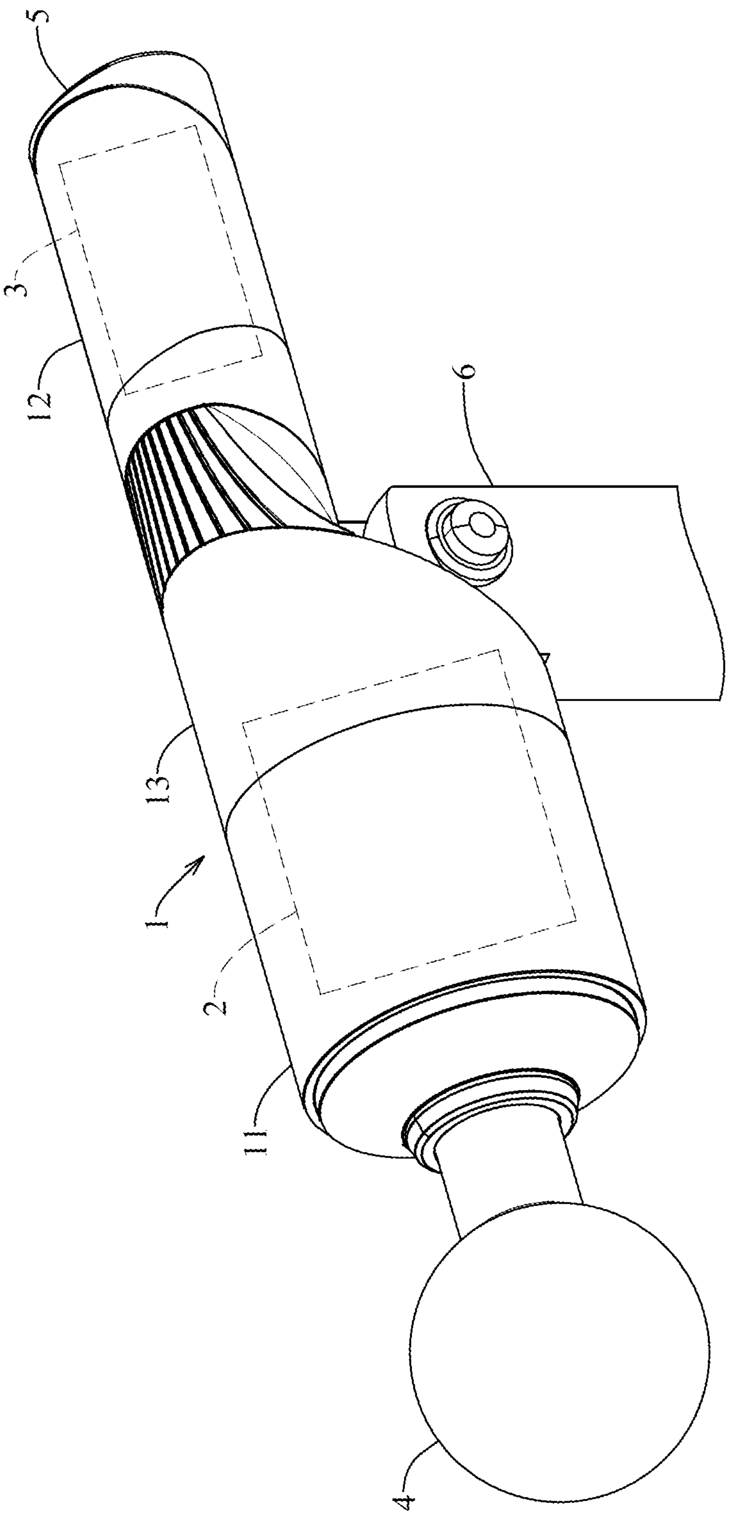
FIG. 1 is a fragmentary perspective schematic view of an embodiment of the hand tool for reducing hand vibration according to the disclosure.
Figure 2:
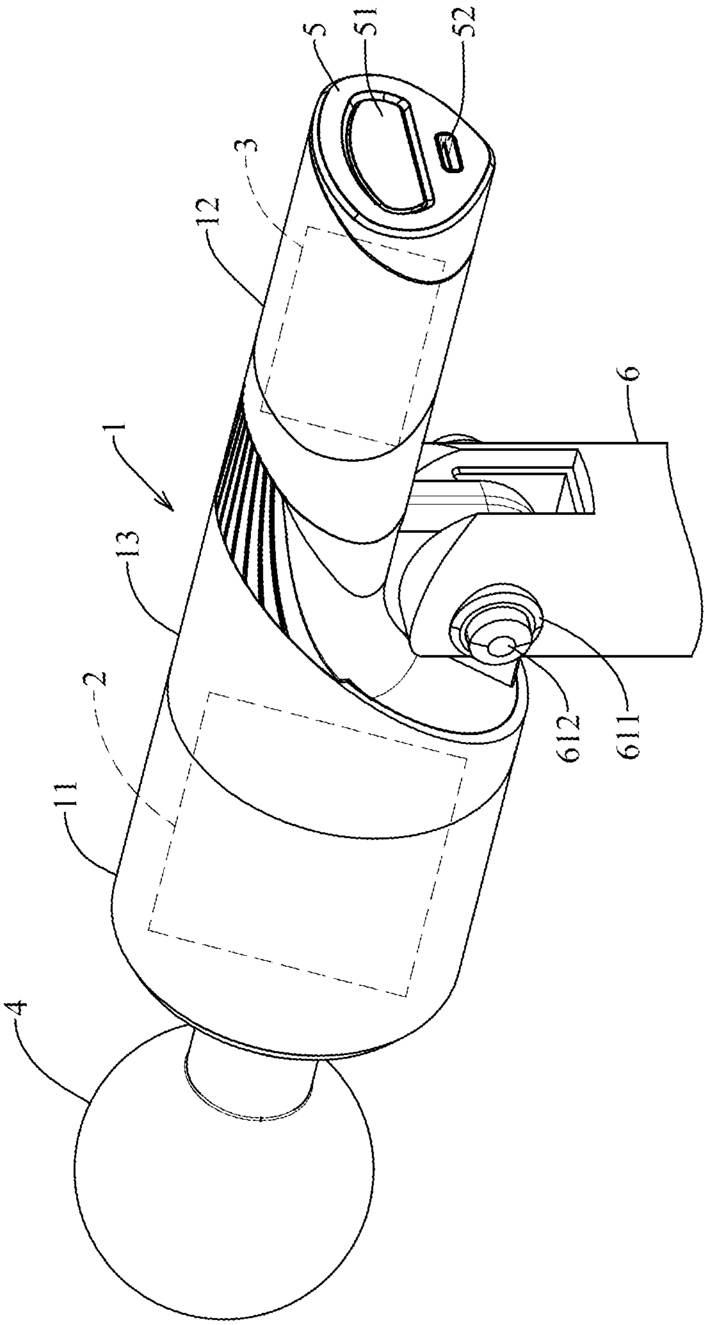
FIG. 2 is another fragmentary perspective schematic view of the embodiment taken from another angle.
Figure 3:
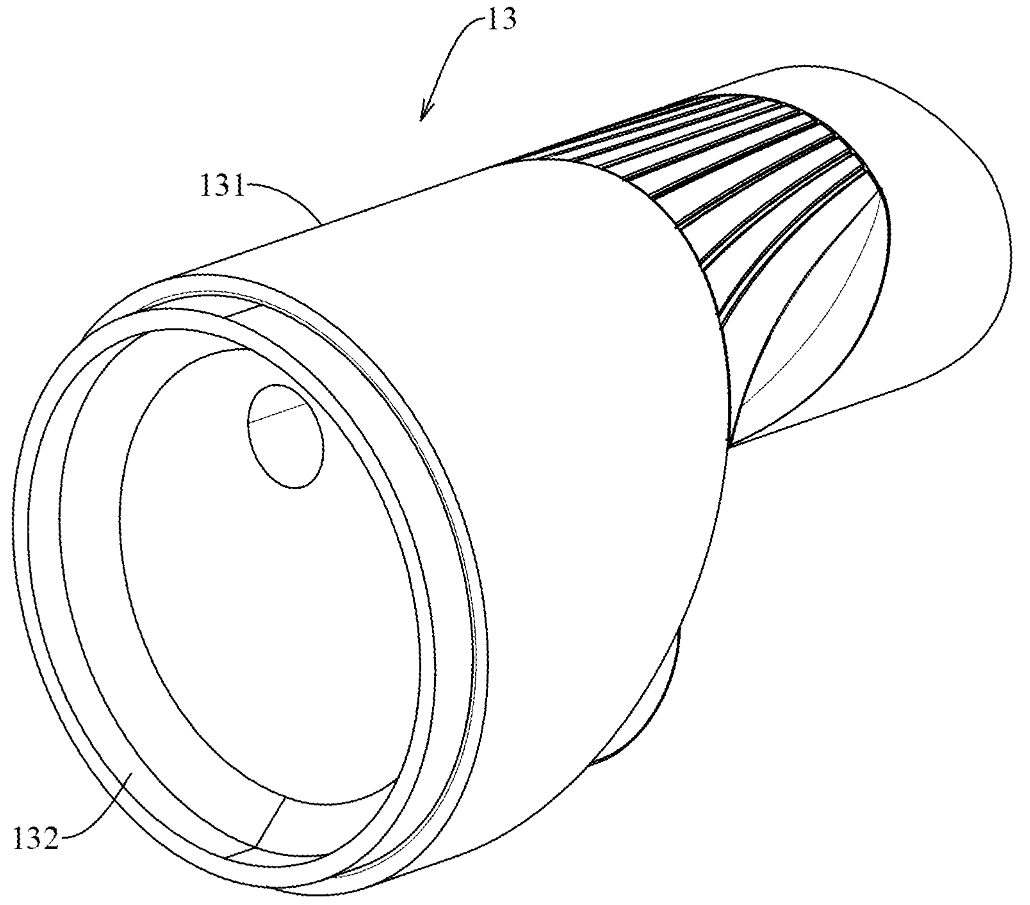
FIG. 3 is a perspective view of a buffering section of the embodiment.
Figure 4:
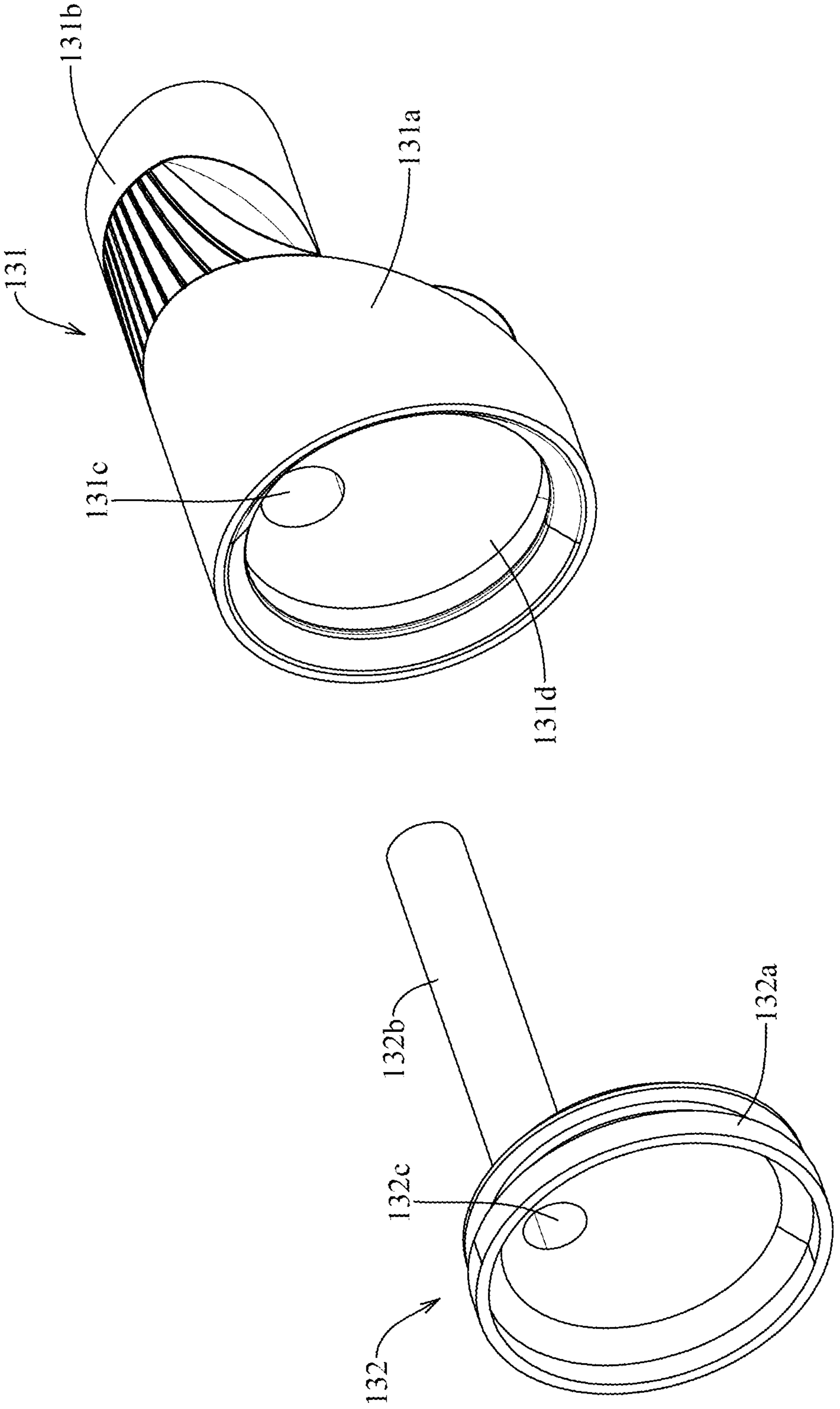
FIG. 4 is an exploded perspective view of the buffering section.
Figure 5:
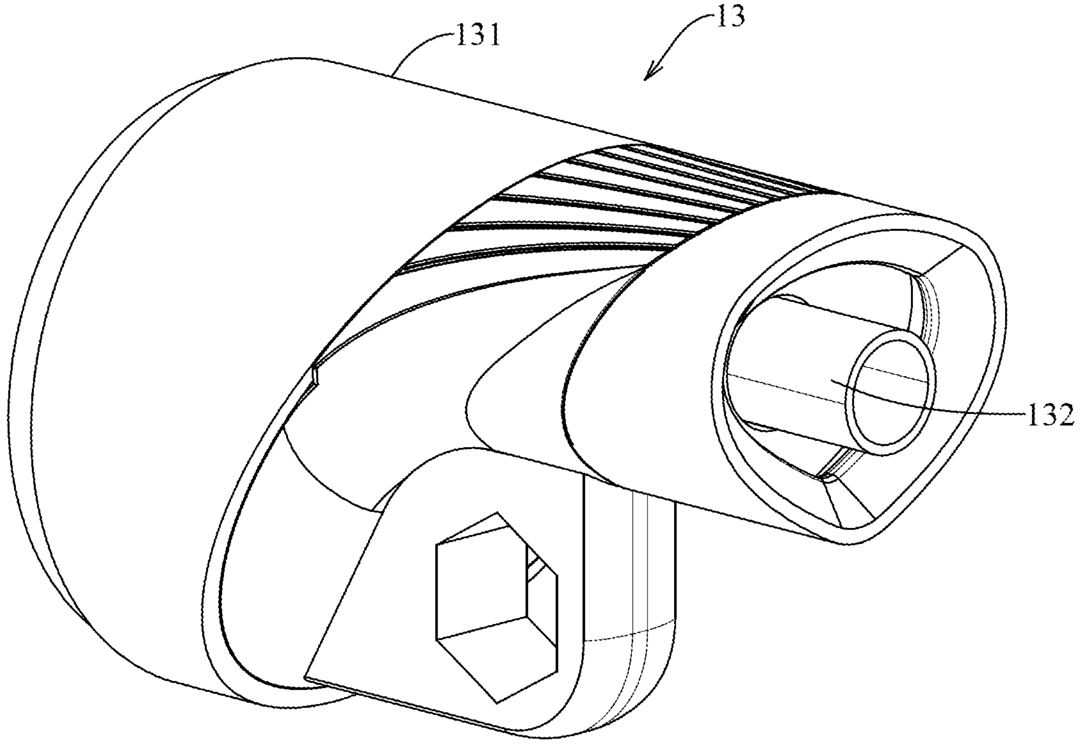
FIG. 5 is another perspective view of the buffering section.
Figure 6:
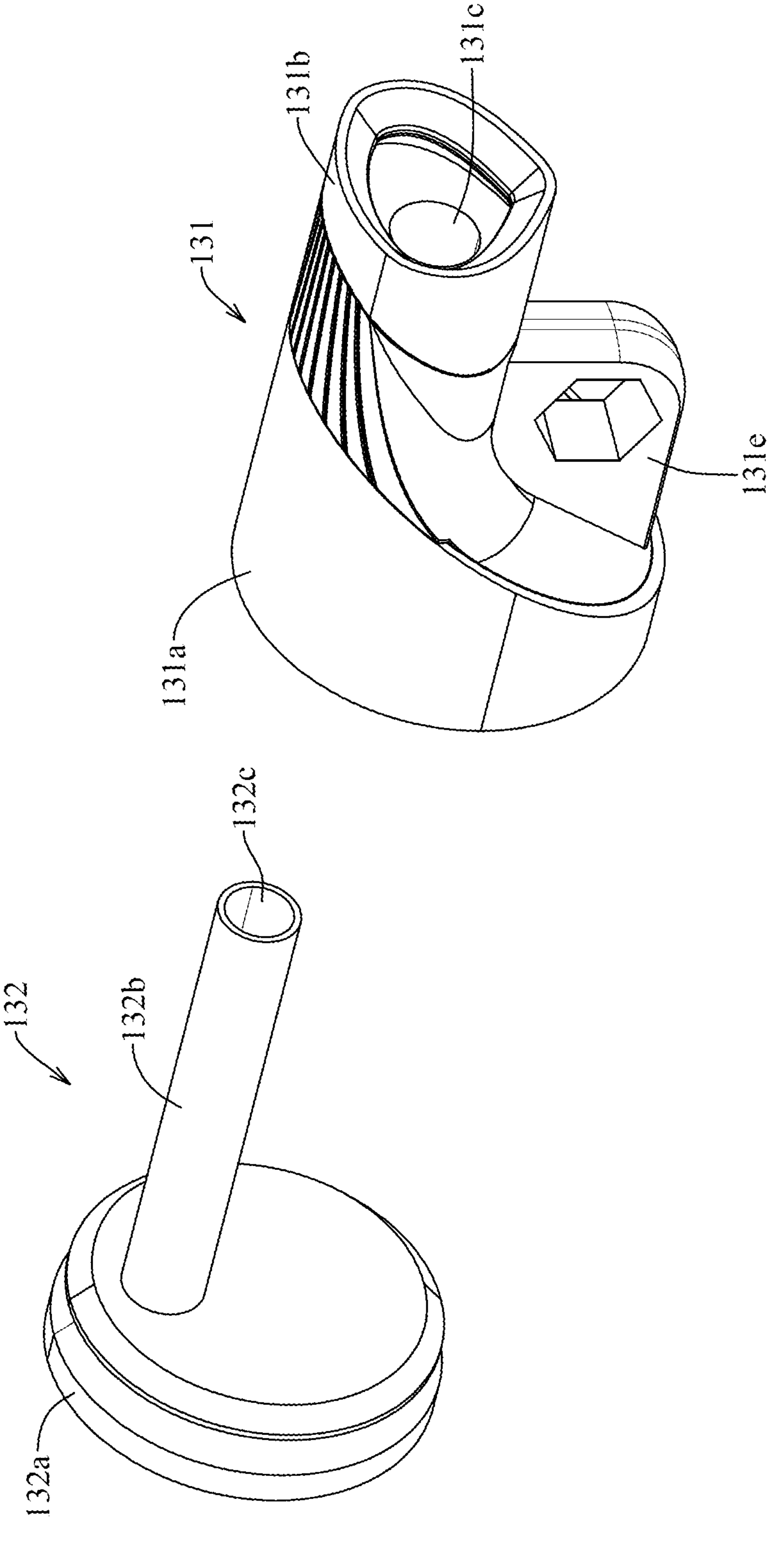
FIG. 6 is another exploded perspective view of the buffering section.

Referring to FIGS. 1 and 2, an embodiment of hand tool for reducing hand vibration for reducing hand vibration according to the present disclosure includes a casing 1, a driving module 2, a power module 3, a workpiece 4, a control module 5, and a handle 6.

The casing 1 includes a front section 11, a rear section 12, and a buffering section 13 connected to the front and rear sections 11, 12. The front and rear sections 11, 12 are hollow structures. The driving module 2 is disposed on the front section 11. The power module 3 is disposed on the rear section 12, and is electrically connected to the driving module 2 for supplying electricity to the driving module 2. The rear section 12 is able to be gripped. Referring to FIGS. 3 to 6, in this embodiment, the buffering section 13 has a main body 131 and a protective member 132. The main body 131 is made of an elastic material, such as silicone rubber. The main body 131 has a large diameter portion 131*a* connected to the front section 11, a small diameter portion 131*b* extending from the large diameter portion 131*a* and connected to the rear section 12, a communication channel 131*c* running through the large diameter portion 131*a* and the small diameter portion 131*b*, and an installation slot 131*d* formed in the large diameter portion 131*a* and adjacent to the front section 11. The small diameter portion 131*b* has a cross-sectional area that is smaller than that of the large diameter portion 131*a*, and is eccentric with respect to the large diameter portion 131*a*. The main body 131 further has a handle connecting portion 131*e* connecting the large diameter portion 131*a* and the small diameter portion 131*b* for connecting the handle 6. The protective member 132 includes a disc body portion 132*a* installed in the installation slot 131*d*, and a tube body portion 132*b* extending from the disc body portion 132*a* and extending through the communication channel 131*c*. The disc body portion 132*a* and the tube body portion 132*b* cooperatively defining a wire channel 132*c* for allowing a wire (not shown) that interconnects the driving module 2 and the power module 3 to pass therethrough, thereby completing the electrical connection between the driving module 2 and the power module 3. In this embodiment, the protective member 132 is made of plastic to protect the main body 131 so as to prevent the silicone-rubber-made main body 131 from being cut through by the vibrating wire.

Referring to FIGS. 1 and 2, the workpiece 4 is connected to the driving module 2, extends out of the front section 11, and is driven by the driving module 2 to operate. In this embodiment, the workpiece 4 is a massaging head that is driven by the driving module 2 to move back and forth. The control module 5 is disposed on a distal end of the rear section 12, is electrically connected to the driving module 2 and the power module 3, and has a control button 51 which is pressable and a USB connector 52. The control button 51 is used to control whether or not the driving module 2 is activated, and the USB connector 52 is adapted to be connected to a charging plug for charging the power module 3. The driving module 2, the power module 3 and the control module 5 can be implemented by conventional techniques, and are not described in detail herein. The user can hold the rear section 12 and move the workpiece 4 to contact a body part which requires massage. Vibration generated during the massage process (i.e., during operation of the workpiece 4) can be absorbed by the buffering section 13 to reduce the vibration transmitted to the rear section 12, thereby reducing the vibration passed on to the hand gripping the rear section 12 and reducing the risk of hand injury caused by vibration.

Figure 7:
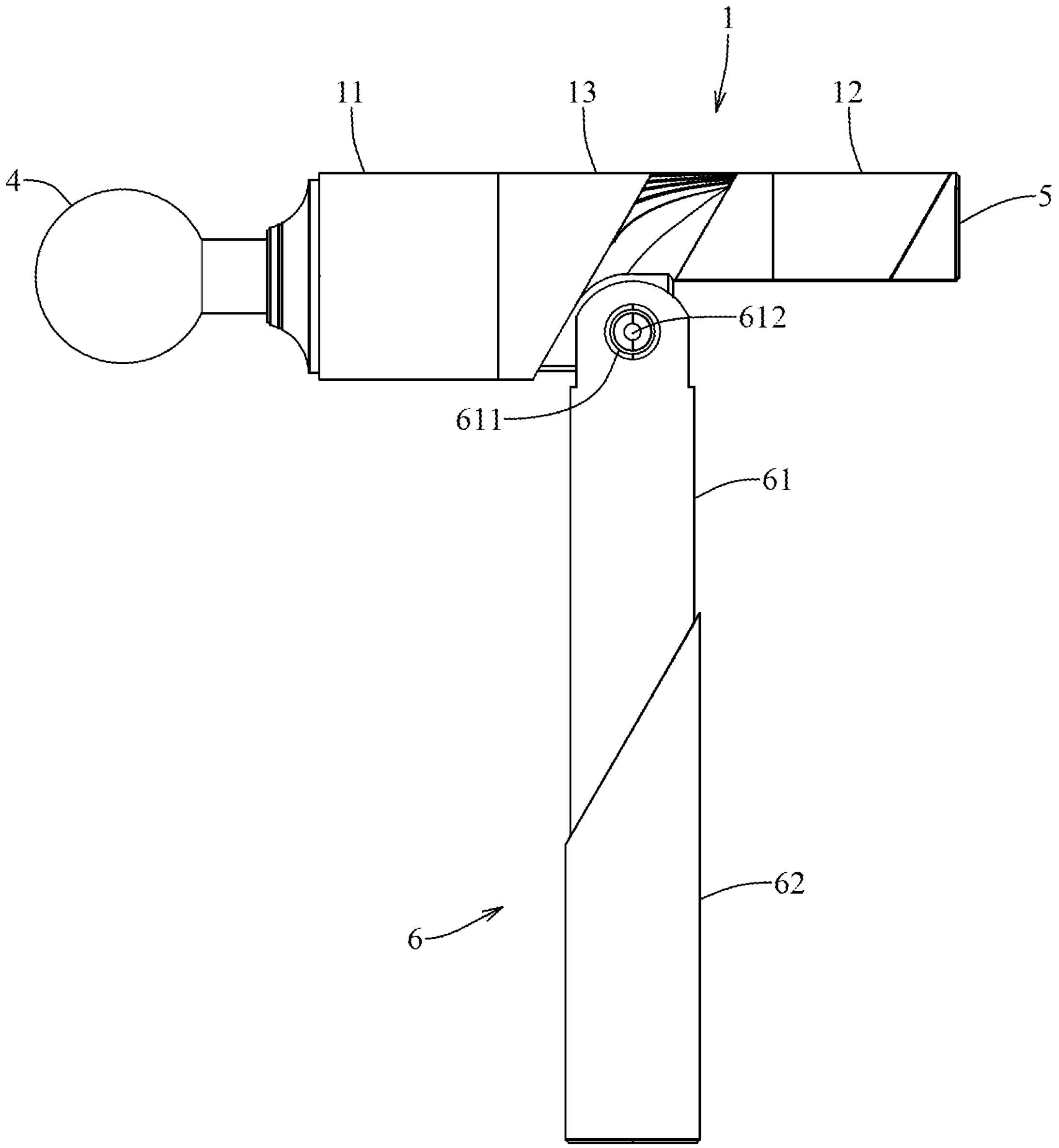
FIG. 7 is a schematic side view of the embodiment, illustrating a handle of the embodiment in an extended state.
Figure 8:
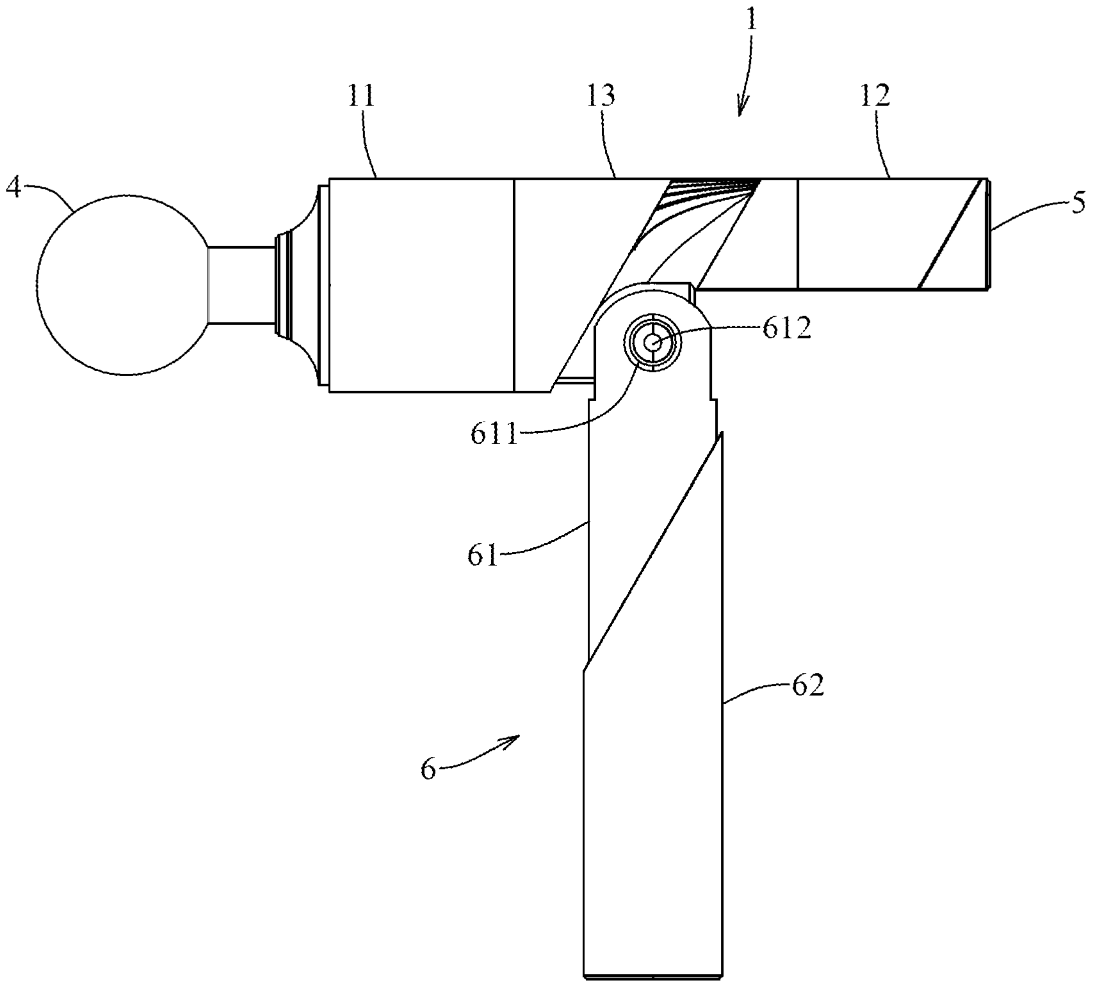
FIG. 8 is a schematic side view illustrating the handle in a shortened state.
Figure 9:
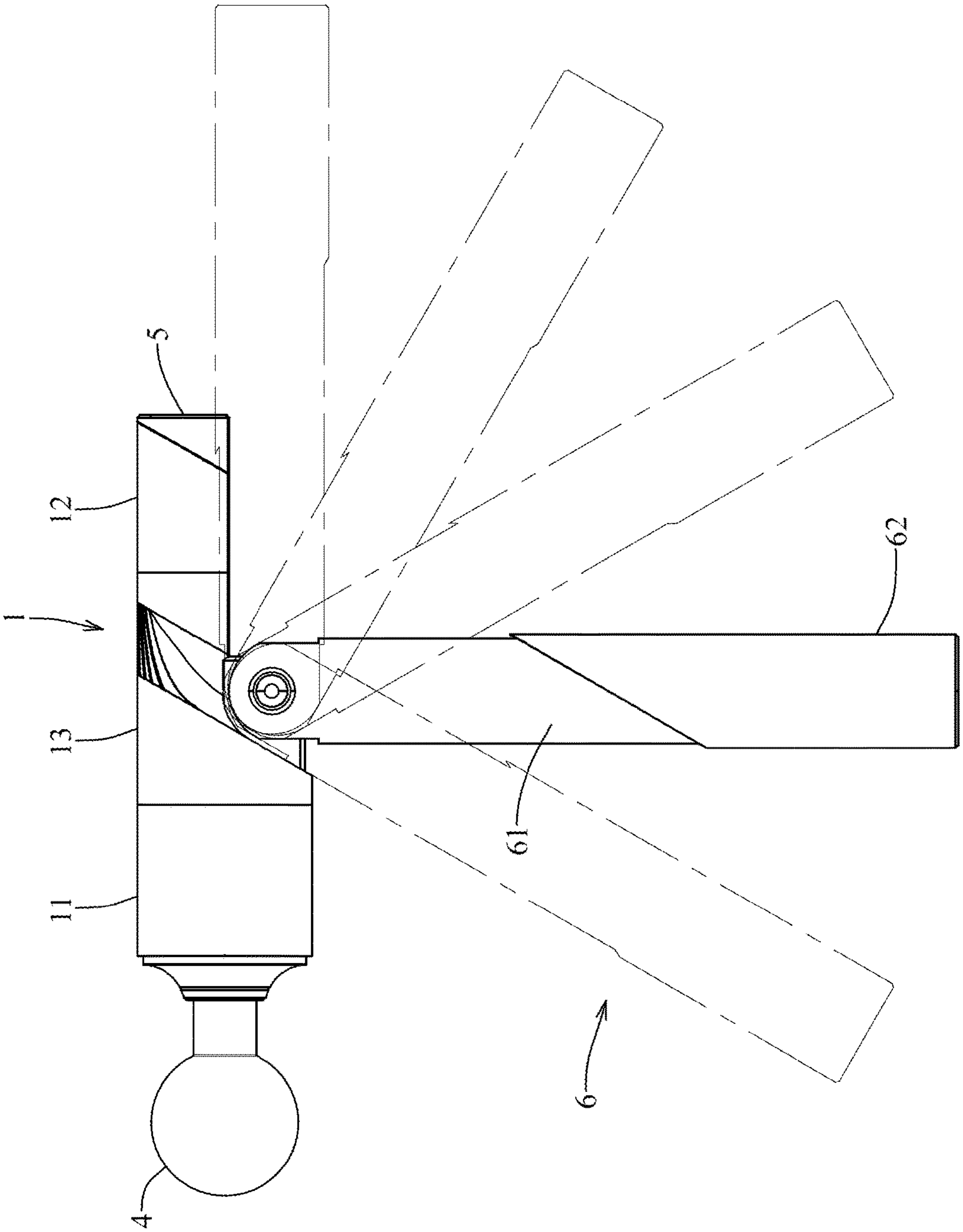
FIG. 9 is a view similar to FIG. 7, but illustrating an adjustable pivot angle of the handle.

Referring to FIGS. 7 to 9, in this embodiment, the handle 6 and the buffering section 13 are detachably connected. The handle 6 has a fixed section 61 connected to the buffering section 13, and a telescopic section 62 connected to the fixed section 61. The fixed section 61 has a hinge 611 (see FIG. 2) and a control button 612. The hinge 611 is used for pivotally engaging and connecting the handle connecting portion 131*e* of the buffering section 13. By pressing the control button 612, the handle 6 can be disengaged from the buffering section 13 to disengage the handle 6 from the buffering section 13. The telescopic section 62 is movable relative to the fixed section 61 to adjust the length of the handle 6. FIG. 7 shows an extended state of the telescopic section 62 relative to the fixed section 61 in which the length of the handle 6 is relatively long. FIG. 8 shows a retracted state of the telescopic section 62 relative to the fixed section 61 in which the length of the handle 6 is relatively short. As shown in FIG. 9, the angle between the handle 6 and the buffering section 13 is adjustable. The user can pivot the handle 6 relative to the buffering section 13 as needed, which allows easy application of force to abut the workpiece 4 against the location requiring massage when the user is gripping the handle 6. Simultaneously, vibration generated during operation of the workpiece 4 can be absorbed by the buffering section 13 to reduce vibration transmitted to the handle 6, thereby reducing the vibration of the hand gripping the handle 6 and reducing the risk of injury of the hand caused by vibration.

Figure 10:
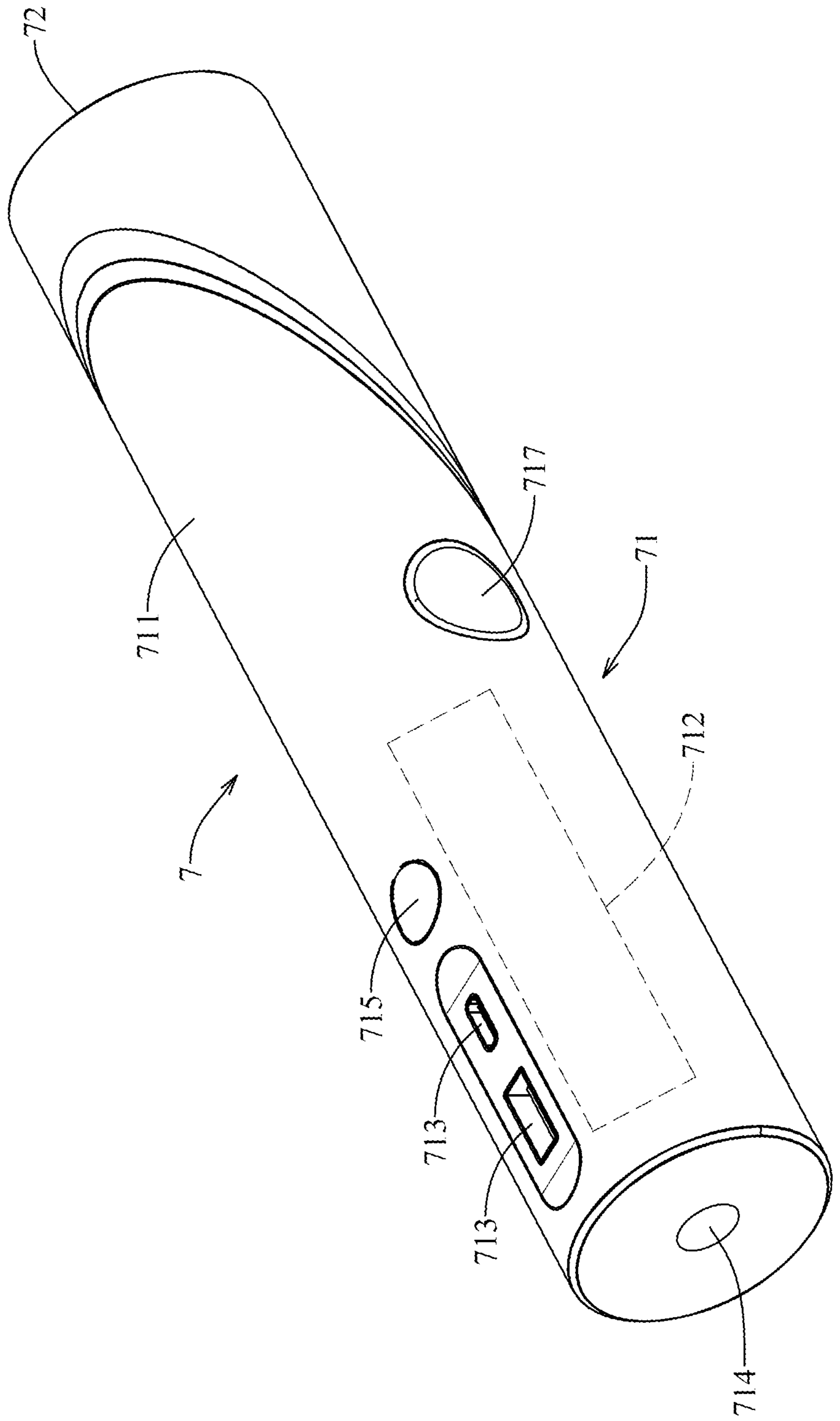
FIG. 10 is a perspective view of an expansion module of the embodiment.
Figure 11:
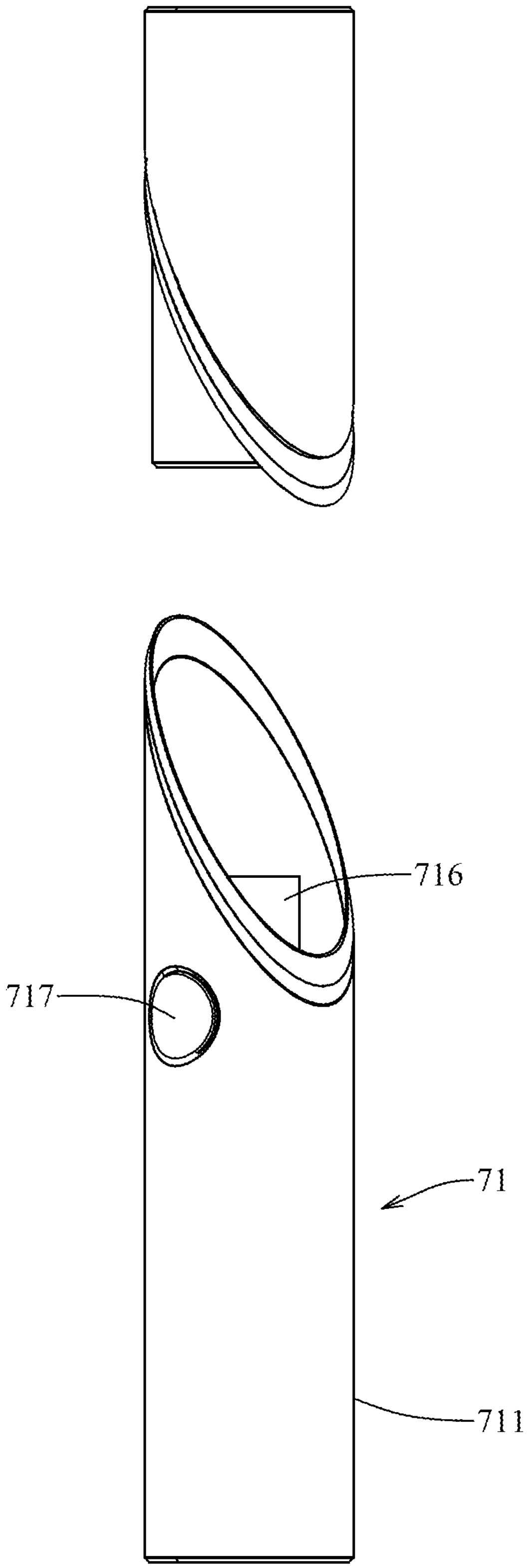
FIG. 11 is an exploded perspective schematic view of the expansion module.
Figure 12:
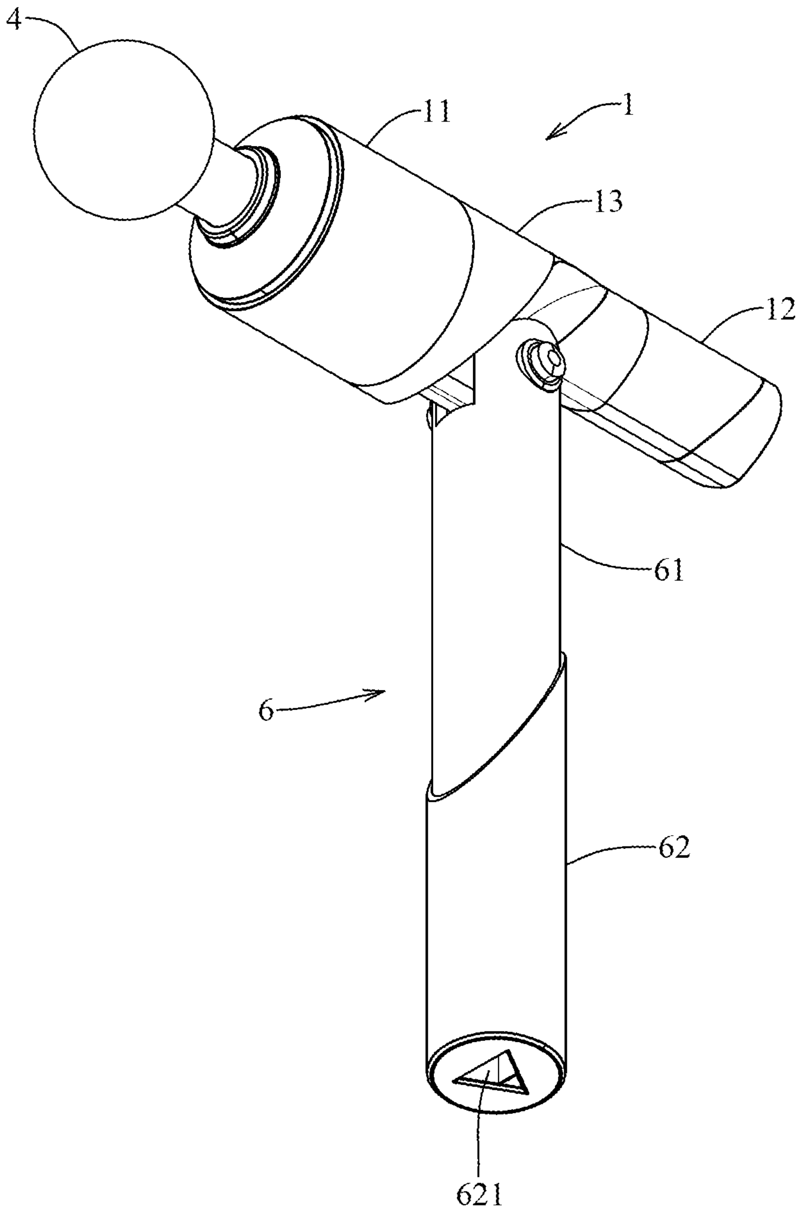
FIG. 12 is a perspective schematic view of the embodiment.
Figure 13:
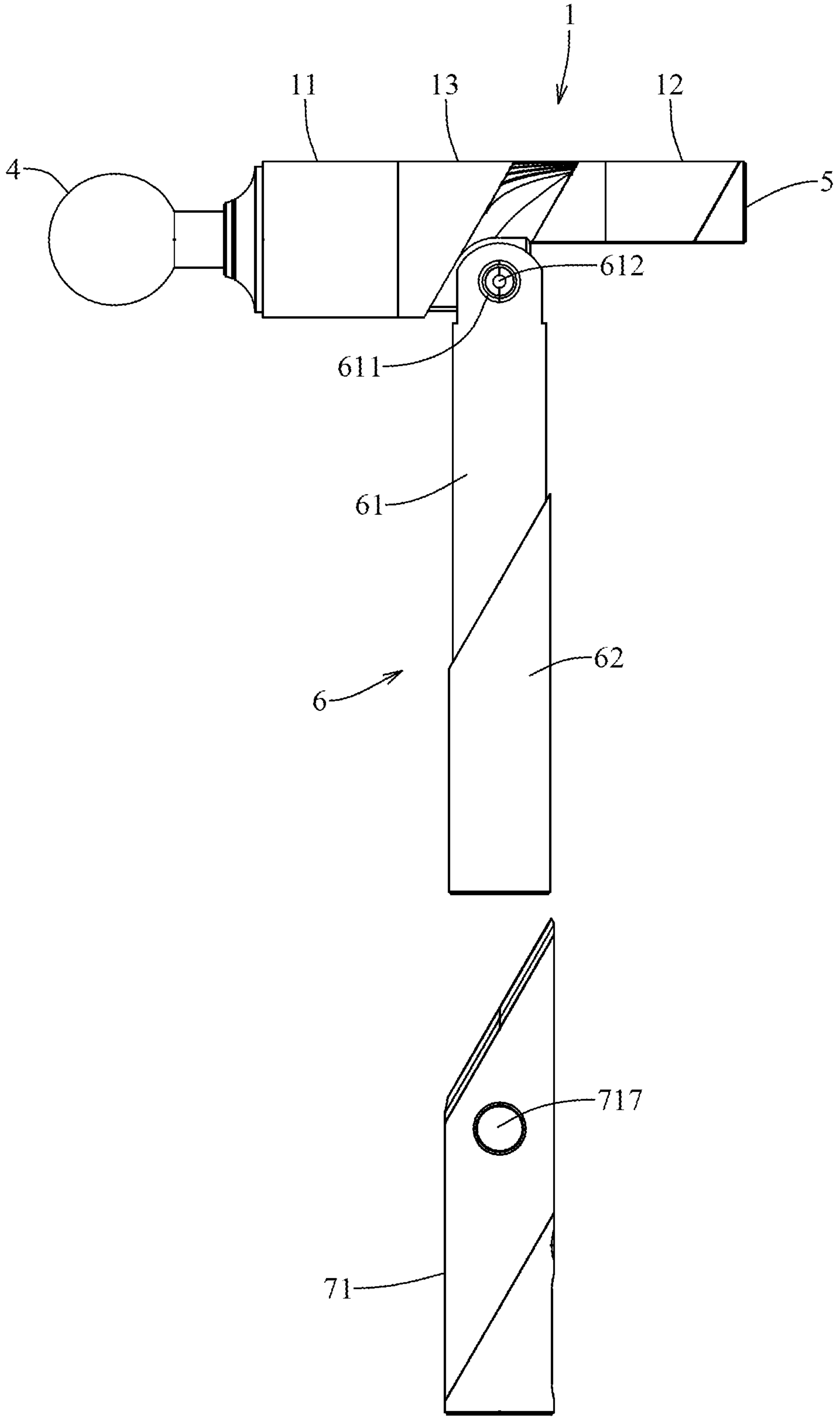
FIG. 13 is an exploded schematic side view illustrating a state of an extension member of the expansion module before being combined with the handle.
Figure 14:
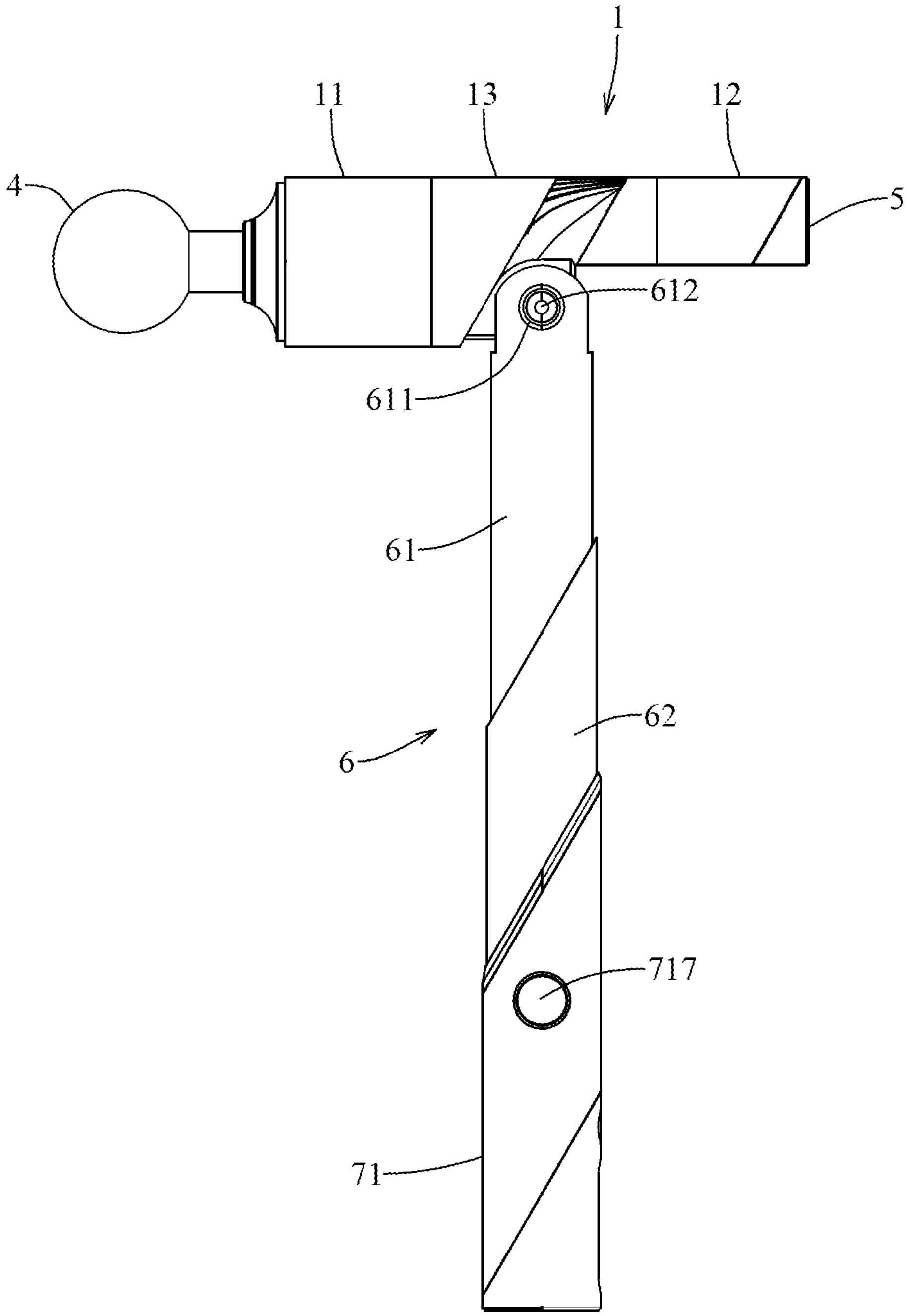
FIG. 14 is a combined schematic side view of FIG. 13.

Referring to FIGS. 10 and 11, in this embodiment, the hand tool further includes an expansion module 7. The expansion module 7 includes an extension member 71 and a cover 72. The extension member 71 includes a barrel body 711, a chargeable and dischargeable battery 712 disposed in the barrel body 711, two electrical connectors 713 exposed from the barrel body 711 and electrically connected to the battery 712, a light emitting element 714 disposed on one end of the barrel body 711, a switch button 715, a buckling portion 716 and an unlock button 717. The light emitting element 714 is electrically connected to the battery 712 such that the extension member 71 may be used as a flashlight. The switch button 715 is electrically connected to the light emitting element 714 to turn the light emitting element 714 on or off. The electrical connectors 713 are different types of connectors, one of which is a Type A USB connector 52, where the other is a Type C USB connector 52. The electrical connectors 713 are available for connection with different types of USB plugs to either charge the battery 712, or use the battery 712 as a mobile power source. The cover 72 covers the barrel body 711 at one end opposite to the light emitting element 714. Referring to FIGS. 12 to 14, in this embodiment, the telescopic section 62 of the handle 6 has a connecting hole 621 at a distal end thereof. The extension member 71 is removably connected to the handle 6 so as to extend the length of the handle 6. To connect the extension member 71 to the handle 6, the cover 72 is removed first, then the buckling portion 716 and the connecting hole 621 are engaged with each other. When it is desired to detach the extension member 71, the unlock button 717 is pressed to disengage the buckling portion 716 from the connecting hole 621 so as to separate the extension member 71 from the handle 6. Thus, the expansion module 7 can be used multi-functionally.

In summary, the vibration generated during operation of the workpiece 4 can be absorbed by the buffering section 13, so that the vibration on the hand gripping the hand tool can be reduced in order to reduce the risk of the hand being injured.

In the present description, the terms "attached", "connected", "fixed", etc. should be understood in a broad sense, and may be fixed connection, detachable connection, or be integral; may be mechanical connections or electrical connections; may be directly connected, or may also be indirectly connected through a middle medium, may be the internal connection between two elements or interaction relationship of the two elements. A person skilled in the art may appreciate the specific meaning of the foregoing terms in this disclosure. Furthermore, the specific features, structures, etc. described in the embodiments are included in at least one embodiment, such as those skilled in the art may combine features of different implementations without conflicting with each other. The scope of protection of the present disclosure is not limited to the above-described specific example approaches, following the basic technical idea according to the present disclosure, those ordinarily skilled in the art need not engage in creative labor and can reason out an implementation, all the aforementioned belong to the scope of protection of the present disclosure.

However, the above is merely an embodiment of the present disclosure, and certainly the scope of practicing the present disclosure is not limited thereto. Any equivalent variation and modification made according to the claims of the present disclosure and the specification of the present disclosure should still be within the scope covered by the present disclosure.

What is claimed is:

1. A hand tool for reducing hand vibration, comprising:

a casing including a front section, a rear section, and a buffering section connected between said front section and said rear section, said buffering section being made of an elastic material, said rear section being adapted for gripping;

a driving module disposed on said front section;

a power module disposed on said rear section, and electrically connected to said driving module to supply electricity to said driving module;

a workpiece connected to said driving module, extending out of said front section, and driven by said driving module to operate;

a handle connected to said buffering section; and an expansion module including an extension member that is removably connected to said handle for increasing a length of said handle;

wherein said extension member includes a barrel body, a chargeable and dischargeable battery disposed in said barrel body, and at least one electrical connector exposed from said barrel body and electrically connected to said battery.

2. The hand tool for reducing hand vibration as claimed in claim 1, wherein said handle and said buffering section are removably connected to each other.

3. The hand tool for reducing hand vibration as claimed in claim 1, wherein said handle and said buffering section are pivotably interconnected so that an angle between said handle and said buffering section is adjustable.

4. The hand tool for reducing hand vibration as claimed in claim 1, wherein said handle includes a fixed section connected to said buffering section, and a telescopic section connected to said fixed section, said telescopic section being movable relative to said fixed section to adjust a length of said handle.

5. The hand tool for reducing hand vibration as claimed in claim 1, wherein said extension member further includes a light emitting element disposed on said barrel body opposite to the one an end connected to said handle, said light emitting element being electrically connected to said battery, such that said extension member can be is configured to be used as a flashlight.

6. The hand tool for reducing hand vibration as claimed in claim 1, further comprising a control module disposed on an end of said rear section, electrically connected to said driving module and said power module, and including a control button that is pressable.

7. The hand tool for reducing hand vibration as claimed in claim 1, wherein said workpiece is a massaging head.

8. A hand tool for reducing hand vibration, comprising:

a casing including a front section, a rear section, and a buffering section connected between said front section and said rear section, said buffering section being made of an elastic material, said rear section being adapted for gripping;

a driving module disposed on said front section;

a power module disposed on said rear section, and electrically connected to said driving module to supply electricity to said driving module; and a workpiece connected to said driving module, extending out of said front section, and driven by said driving module to operate, wherein said buffering section includes a main body and a protective member;

wherein said main body has a large diameter portion connected to said front section, a small diameter portion extending from said large diameter portion and connected to said rear section, a communication channel extending through said large diameter portion and said small diameter portion, and an installation slot formed in said large diameter portion and adjacent to said front section; and wherein said protective member includes a disc body portion installed in said installation slot, and a tube body portion extending from said disc body portion and extending into said communication channel, said disc body portion and said tube body portion cooperatively defining a wire channel.

* * * * *